United States Patent
Tada (10) Patent No.: US 9,287,775 B2
(45) Date of Patent: Mar. 15, 2016

(54) POWER SUPPLY DEVICE AND LIGHTING DEVICE

(75) Inventor: Ryohhei Tada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 68 days.

(21) Appl. No.: 14/237,124

(22) PCT Filed: Aug. 10, 2012

(86) PCT No.: PCT/JP2012/070473
§ 371 (c)(1),
(2), (4) Date: Apr. 28, 2014

(87) PCT Pub. No.: WO2013/024811
PCT Pub. Date: Feb. 21, 2013

(65) Prior Publication Data
US 2014/0306621 A1    Oct. 16, 2014

(30) Foreign Application Priority Data

Aug. 12, 2011 (JP) ................................ 2011-177081

(51) Int. Cl.
*H05B 41/00* (2006.01)
*H02M 3/156* (2006.01)
(Continued)

(52) U.S. Cl.
CPC ........... *H02M 3/156* (2013.01); *H05B 33/0815* (2013.01); *H02M 1/32* (2013.01); *Y02B 20/347* (2013.01)

(58) Field of Classification Search
CPC .......... H02M 1/32; H02M 2003/1556; H02M 3/156; H05B 33/0815; Y02B 20/347
See application file for complete search history.

(56) References Cited

U.S. PATENT DOCUMENTS

| 7,940,535 B2 * | 5/2011 | Itoh .................... H05B 41/2882 315/158 |
| 2003/0117088 A1 | 6/2003 | Tanabe et al. |
| 2004/0090805 A1 * | 5/2004 | Kitano ................ H02H 7/1227 363/55 |

(Continued)

FOREIGN PATENT DOCUMENTS

| JP | 6-12136 A | 1/1994 |
| JP | 2003-187614 A | 7/2003 |

(Continued)

OTHER PUBLICATIONS

International Search Report for PCT/JP2012/070473 mailed on Nov. 13, 2012.

*Primary Examiner* — Jason M Crawford
*Assistant Examiner* — Kurtis R Bahr
(74) *Attorney, Agent, or Firm* — Birch, Stewart, Kolasch & Birch, LLP (57) ABSTRACT

A power supply device is provided with the following: a rectifier circuit that rectifies an alternating voltage from an alternating current source; a booster circuit that boosts the voltage after rectification, and generates an input side voltage of a voltage conversion unit; the voltage conversion unit that outputs a voltage required for reducing the input side voltage and supplying the input side voltage to a light source; a voltage current detection unit that determines whether or not the light source is connected; and an output voltage control unit that, if it is determined that a first resistor and a second resistor, which are connected in parallel with respect to the light source, and the light source are not connected, controls the voltage of the first resistor so that the voltage is no more than a prescribed value.

14 Claims, 5 Drawing Sheets

(51) Int. Cl.
*H05B 33/08* (2006.01)
*H02M 1/32* (2007.01)

(56) References Cited

U.S. PATENT DOCUMENTS

| | | | |
|---|---|---|---|
| 2008/0180179 A1* | 7/2008 | Polizzo | H01J 37/32082 330/304 |
| 2009/0289557 A1* | 11/2009 | Itoh | H05B 41/2882 315/127 |
| 2009/0295776 A1* | 12/2009 | Yu | H05B 33/0818 345/212 |
| 2010/0060204 A1* | 3/2010 | Ohtake | H05B 33/0851 315/307 |
| 2010/0225235 A1* | 9/2010 | Nagase | H05B 33/0815 315/130 |
| 2011/0074292 A1* | 3/2011 | Maehara | H05B 33/0815 315/32 |
| 2012/0019166 A1 | 1/2012 | Terasaka et al. | |
| 2012/0161649 A1* | 6/2012 | Hamamoto | H05B 33/0887 315/187 |

FOREIGN PATENT DOCUMENTS

| | | |
|---|---|---|
| JP | 2009-10100 A | 1/2009 |
| JP | 2009-195033 A | 8/2009 |
| JP | 2010-55824 A | 3/2010 |
| JP | 2012-28222 A | 2/2012 |

* cited by examiner

POWER SUPPLY DEVICE AND LIGHTING DEVICE

CROSS-REFERENCE TO RELATED APPLICATIONS

This non-provisional application is a National Stage entry under U.S.C. §371 of International Application No. PCT/JP2012/070473 filed on Aug. 10, 2012, which claims the benefit of Japanese Patent Application No. 2011-177081 filed in Japan on Aug. 12, 2011. The entire contents of all of the above applications are hereby incorporated by reference.

BACKGROUND

1. Technical Field

The present invention relates to a power supply device including a voltage conversion unit that outputs a voltage required for a load and a lighting device including the power supply device.

2. Description of Related Art

Recently, lighting devices using a light emitting diode (LED) as a light source have been developed for various applications and have replaced a lighting device using conventional light sources such as a light bulb and a fluorescent lamp. Generally, an LED has a prescribed amount of current applied thereto to be able to obtain a required brightness. Therefore, in a lighting device using an LED as the light source, a power supply device including a constant current circuit is typically used to drive the LED.

For example, a rear combination lamp device for a vehicle including the power supply device that converts an input voltage into a required DC voltage by boosting the input voltage from a DC power supply using a booster circuit and smoothing the boosted voltage by using a smoothing capacitor so as to supply the voltage from the power supply device to an LED unit (a light source) in which a plurality of LEDs are connected in series has been disclosed in the related art (see Japanese Patent Application Laid-open No. 2003-187614).

SUMMARY

However, in a conventional lighting device, the power supply device includes a smoothing capacitor having a relatively high capacitance so as to output a voltage with a small ripple to the LED unit. When the LED unit is removed from the light device for any reason, since an output current flowing in the LED unit becomes zero, the power device raise an output voltage to increase the output current. Further, an operation of the power supply device stops when the output voltage reaches a prescribed upper limit value. Since a charge stored in the smoothing capacitor is discharged only by self-discharging, the voltage of the smoothing capacitor holds a high voltage (an overvoltage) for a long period of time. In this state, when the LED unit is installed again, the charge stored in the smoothing capacitor suddenly flows through the LED unit, such that an overcurrent may flow in the LED unit. Further, when the light source is replaced by the LED unit which has the same brightness with reduced number of LEDs connected in series, there is a problem in that the overvoltage may be applied to the LED unit relative to the reduced number of LEDs.

In consideration of the above-mentioned circumstances, it is an object of the present invention to provide a power supply device that is capable of preventing an output voltage from becoming an overvoltage even when a load (a light source) is removed therefrom and a lighting device including the power supply device.

A power supply device according to the present invention includes: a first resistor which is connected in parallel between output terminals; a determination unit configured to determine whether or not a load is connected between the output terminals; a second resistor which is connected to the first resistor in series; and an output voltage control unit which divides an input side voltage by the first resistor and the second resistor to control a voltage between the output terminals so that the voltage is a prescribed value or less, when the determination unit determines that the load is not connected.

In the present invention, the power supply device includes the first resistor which is connected in parallel between output terminals and the second resistor which is connected to the first resistor in series. The determination unit determines whether or not the load (for example, a light source) is connected, and, when the determination unit determines that the load is not connected, the output voltage control unit divides an input side voltage by the first resistor and the second resistor to control a voltage between the output terminals so that the voltage is a prescribed value or less. It is possible to prevent the output voltage from becoming an overvoltage even when the load (the light source) is removed, by setting the voltage between the output terminals from which the load is removed to become the prescribed value or less through the first resistor.

The power supply device according to the present invention includes: a voltage conversion unit configured to convert the input side voltage into a required voltage and output the voltage to the load; and a driving unit configured to drive the voltage conversion unit, wherein a voltage for operating the driving unit is supplied from the input side voltage through the second resistor.

In the present invention, the power supply device includes the voltage conversion unit configured to convert the input side voltage into a required voltage and output the converted voltage to the load and, the driving unit configured to drive the voltage conversion unit. A voltage for operating the driving unit is supplied from the input side voltage through the second resistor. By using the second resistor as a starting resistor (a resistor for supplying a starting voltage to operate the driving unit) to operate the driving unit, there is no necessity for including a resistor (a resistor for configuring a voltage divider circuit by being connected with the first resistor in series) for limiting the output voltage of the voltage conversion unit in addition to the starting resistor. The resistor for limiting the output voltage requires characteristics to withstand high voltages, such that the size of the resistor may be large and the cost thereof may be relatively high. By using the second resistor as the starting resistor, the number of resistors having characteristics to withstand high voltages may be reduced, the size of the substrate on which each component of the power supply device is mounted may be reduced, or a reduction in cost may be realized.

The power supply device according to the present invention is characterized in that: the second resistor is connected with the first resistor in series through the voltage conversion unit, and the output voltage control unit stops the driving of the voltage conversion unit to control the voltage between the output terminals so that the voltage is a prescribed value or less, when the determination unit determines that the load is not connected.

In the present invention, the second resistor is connected with the first resistor in series through the voltage conversion unit. When the determination unit determines that the load is not connected, the output voltage control unit stops the driving of the voltage conversion unit by the driving unit to control the voltage between the output terminals so that the voltage is a prescribed value or less. When the determination unit determines that the load is not connected, the output voltage control unit stops the driving of the voltage conversion unit and divides the input side voltage by the first and second resistors, thereby controlling the voltage between the output terminals to be a prescribed value or less. As a comparative example, for instance, in a configuration of dividing the input side voltage by a serial circuit of the two resistors and suppressing the overvoltage between the output terminals when the load is not connected, at the time of normal use when a load is connected, the voltage difference between the input side voltage and the divided voltage is applied to one of the two resistors, such that power consumption at the one resistor may be increased. On the other hand, according to the present invention, since the second resistor for dividing the input side voltage is connected to the first resistor through the voltage conversion unit, when a required voltage is output from the voltage conversion unit to the load in the state that the load is connected, the voltage applied to the second resistor may be reduced by as much as an amount corresponding to the average voltage at one end of the second resistor connected to the voltage conversion unit, such that the power consumption during normal use when the load is connected may be suppressed.

The power supply device according to the present invention is characterized in that: the voltage conversion unit includes: a FET; an inductor having one side connected to the FET and the other side connected to the output terminal; and a capacitor connected in parallel between the output terminals, wherein the input side voltage is reduced by the inductor by the on/off operation of the FET to output the required voltage, the second resistor is connected with the first resistor in series through the inductor, and the output voltage control unit stops the on/off operation of the FET and stops the reduction in the input side voltage by the inductor to control the voltage between the output terminals so that the voltage is a prescribed value or less.

In the present invention, the voltage conversion unit includes the FET, the inductor having one side connected to the FET in series and the other side connected to the output terminal, and the capacitor connected in parallel between the output terminals, in which the input side voltage may be reduced by the inductor by the on/off operation of the FET to output the required voltage. That is, the voltage conversion unit reduces the input side voltage by the inductor. The second resistor is connected with the first resistor in series through the inductor. The output voltage control unit stops the on/off operation of the FET and stops the reduction in the input side voltage by the inductor to control the voltage between the output terminals so that the voltage is a prescribed value or less. Therefore, the voltage of the second resistor may be reduced by as much as an amount corresponding to the average reduced voltage by the inductor and the power consumption during normal use when the load is connected may be suppressed.

The power supply device according to the present invention includes: a transistor of which a collector and an emitter are connected between the second resistor and the inductor, wherein the voltage for operating the driving unit is set to become a threshold value or less by turning on the transistor, when the determination unit determines that the load is not connected.

In the present invention, the power supply device includes the transistor of which the collector and the emitter are connected between the second resistor and the inductor. That is, the collector and the emitter of the transistor are connected between the operation voltage terminals applying the voltage for operating the driving unit. Since the voltage for operating the driving unit is supplied from the input side voltage through the second resistor, the transistor is turned on to set the voltage supplied to the driving unit to become a threshold value or less, thereby stopping the operation of the driving unit. That is, when the determination unit determines that the load is not connected, the operation of the driving unit stops and the voltage between the output terminals to which the load is not connected may be set to become a voltage of a prescribed value or less obtained by dividing the input side voltage by the second and first resistors.

The power supply device according to the present invention includes a resistor which is connected to the transistor in series.

In the present invention, the power supply device includes the resistor connected to the transistor in series. Even when the operation of the driving unit stops by turning on the transistor, the resistor is connected to the first resistor and the second resistor in series, such that a required voltage may exist across the resistor, that is, the operation voltage terminals of the driving unit. Further, in the case of operating the driving unit, when the input side voltage is applied through the second resistor, a rise time of the operating voltage of the driving unit in which the voltage exists in the resistor may be shortened.

The power supply device according to the present invention is characterized in that: the voltage conversion unit includes: a plurality of inductors which are connected in series between the FET and one end of the output terminals; and a plurality of capacitors which are connected in parallel between the output terminals and between connection terminals of the inductors and the other end of the output terminals.

In the present invention, the voltage conversion unit includes a plurality of inductors which are connected in series between the FET and one end of the output terminals, and a plurality of capacitors which are connected in parallel between the output terminals and between connection terminal of the inductors and the other end of the output terminal. As such, a plurality of stages of a combination of the inductor and the capacitor of the output side of the inductor are installed to reduce the capacitance of the capacitor while holding the required voltage drop and the discharging time of the capacitor may be shortened to improve the ripple of the output current supplied to the load.

The power supply device according to the present invention includes: a voltage generation unit configured to generate the voltage for operating the driving unit; and a switch element which is installed in an electrical circuit between the voltage generation unit and the driving unit, wherein the output voltage control unit stops the operation of the driving unit by turning off the switch element to control the voltage between the output terminals so that the voltage is a prescribed value or less, when the determination unit determines that the load is not connected.

In the present invention, the power supply device includes the voltage generation unit configured to generate a voltage for generating the driving unit and, the switch element installed in an electrical circuit between the voltage generation unit and the driving unit. The switch element is, for example, the FET, but it is not limited to the FET and may be a bipolar transistor or the like. When the determination unit determines that the load is not connected, the output voltage control unit turns off the switch element to block the voltage supplied from the voltage generation unit to the driving unit so as to stop the operation of the driving unit, thereby controlling the voltage between the output terminals to be a prescribed value or less. For example, when the driving unit is composed of an IC, even though the control terminal is not included in the IC, for stopping the control operation for the voltage conversion unit by the IC, the voltage supplied to the IC is blocked to stop the control operation of the IC, thereby stopping the driving of the voltage conversion unit.

A lighting device according to the present invention includes: the power supply device according to any one of the above; and a detachable light source, wherein a required voltage is output from the power supply device to the light source.

In the present invention, it is possible to provide a lighting device which may prevent the output voltage from becoming an overvoltage even when the light source is removed.

According to the present invention, it is possible to prevent the output voltage from becoming the overvoltage even when the load is removed, by setting the voltage of the load connection terminal from which the load is removed to become the prescribed value or less through the first resistor.

The above and further objects and features of the invention will more fully be apparent from the following detailed description with accompanying drawings.

DETAILED DESCRIPTION (Embodiment 1)

Figure 1:
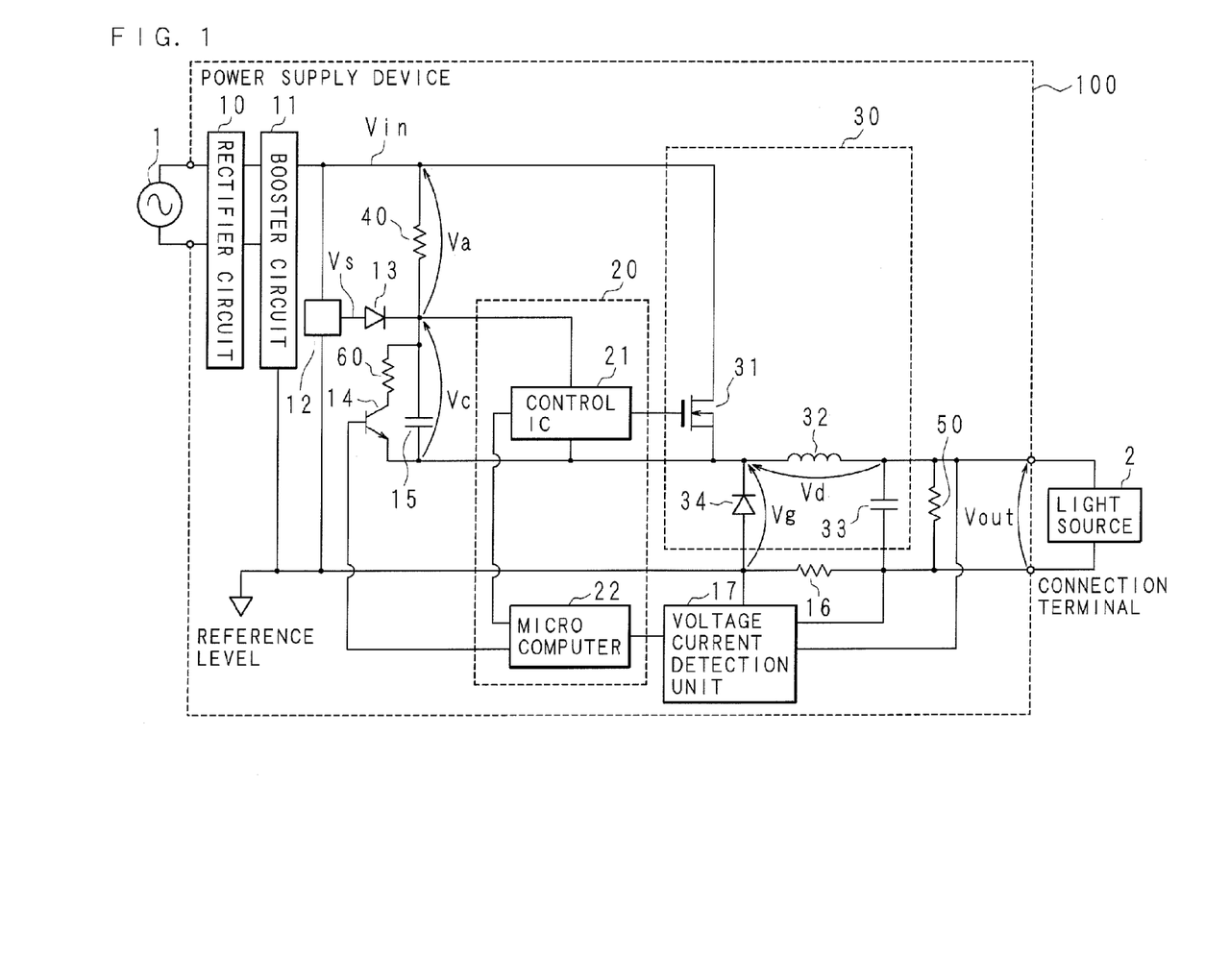
FIG. 1 is a block diagram illustrating an example of a configuration of a lighting device according to embodiment 1.

Hereinafter, embodiments of the present invention will be described with reference to the accompanying drawings. FIG. 1 is a block diagram illustrating an example of a configuration of a lighting device according to embodiment 1. As illustrated in FIG. 1, the lighting device includes a power supply device 100, a light source 2 and the like.

The light source 2 includes, for example, a plurality of LEDs connected in series and a resistor (not illustrated) which is connected in parallel to the plurality of LEDs connected in series. The light source 2 may be detachable and may be removed from the power supply device 100. Further, the light source 2 may be configured to include one LED group in which the plurality of LEDs are connected in series or may have a configuration in which a plurality of LED groups are connected in parallel. The light source 2 is, for example, a straight tubular LED light source which can replace a 40 W fluorescent lamp. Further, a shape of the light source 2 is not limited to the straight tubular shape.

When a prescribed forward current If is flowed through the LEDs, each LED generates a prescribed forward voltage Vf. When the number of series of the LEDs of the light source 2 is set to be N, a total value VF of the forward voltage of each LED of the light source 2 becomes VF=N×Vf. For example, when Vf is equal to about 3.5 V and N is equal to 20, the Vf becomes about 70 V. Further, the number of LEDs and the forward voltage Vf are only an example, and therefore they are not limited thereto.

The power supply device 100 includes: a rectifier circuit 10 that rectifies an alternating voltage from an alternating current source 1; a booster circuit 11 that boosts the voltage after rectification and generates an input side voltage Vin of a voltage conversion unit 30 to be described below; the voltage conversion unit 30 that reduces the input side voltage Vin and outputs a required voltage Vout to the light source 2; a voltage current detection unit 17 as a determination unit that determines whether or not the light source 2 is connected, a first resistor 50 which is connected to the light source 2 in parallel, a second resistor 40, an output voltage control unit 20 that controls the voltage Vout of the first resistor 50 so that the voltage Vout is a prescribed value or less (for example, 45 V or less) and the like. The light source 2 may be detachably installed between output terminals (connection terminals) of the power supply device 100. Hereinafter, a configuration of the power supply device 100 will be described in detail.

The voltage conversion unit 30 includes a FET 31, an inductor 32, a capacitor 33 as a smoothing capacitor, a diode 34 and the like.

A drain of the FET 31 is connected to an output terminal (an input voltage side) of the booster circuit 11 and the voltage boosted by the booster circuit 11 is supplied to the voltage conversion unit 30 (the drain of the FET 31) as the input side voltage Vin. A gate of the FET 31 is connected to an output terminal of a control IC 21 to be described below. An input terminal (one side) of the inductor 32 and a cathode of the diode 34 are connected to a source of the FET 31. An anode of the diode 34 is connected to a reference level. Further, instead of the diode 34, a FET may also be installed. Further, the reference level is a negative side potential level of an output terminal of the rectifier circuit 10.

An output terminal (the other side) of the inductor 32 is connected to one end of the connection terminals of the light source 2 (one end of the output terminals). The capacitor 33 connected to the light source 2 in parallel is installed between the output terminal of the inductor 32 and the reference level (between the output terminals). The first resistor 50 is also connected between the output terminal of the inductor 32 and the reference level, and is connected to the light source 2 in parallel.

The voltage conversion unit 30 turns on/off the FET 31 depending on a gate signal which is output from the control IC 21. Further, a frequency of the on/off operation is fixed to a prescribed value by the control IC. Further, the duty ratio of a ratio of an on time of the FET 31 to one cycle is controlled by the control IC 21.

When the FET 31 is turned on, a current flows from an input side of the inductor 32 to an output side thereof by the input side voltage Vin from the booster circuit 11, and the voltage Vout is supplied to the light source 2. In this case, energy is stored in the inductor 32.

When the FET 31 is turned off, the inductor 32 generates an electromotive force to hold a flowing current and makes a current flow from the input side of the inductor 32 to the output side thereof through the diode 34 to supply the voltage Vout to the light source 2. By this, the light source 2 is applied with the required forward current to be lit.

When the FET 31 is turned on/off, a voltage (a reducing voltage Vd) for reducing the input side voltage Vin is generated in the inductor 32 and the power supply device 100 outputs the required output voltage Vout. The input side voltage Vin from the booster circuit 11 is, for example, 400 V and the voltage Vout across the light source 2 is, for example, 70 V in the state that the light source 2 is lit.

The voltage current detection unit 17 detects a voltage across a current detection resistor 16 which is connected to the light source 2 in series and detects a current flowing in the light source 2. Further, the voltage current detection unit 17 detects a voltage across the resistor 50.

When the light source 2 is removed from the power supply device 100, the current flowing in the light source 2 becomes zero, such that the voltage conversion unit 30 may raise the voltage Vout so as to increase the current. The voltage current detection unit 17 determines that when the voltage Vout becomes a prescribed upper limit value Vm or more, the light source 2 is not connected. Further, it may be determined that when the current flowing in the light source 2 becomes a prescribed lower limit value Im or less, the light source 2 is not connected.

When it is determined that the light source 2 is removed, the voltage current detection unit 17 outputs a determination signal to a microcomputer 22 to be described below.

The output voltage control unit 20 includes the control IC 21 as the driving unit, the microcomputer 22 and the like.

The DC/DC converter 12 is installed at an output side of the booster circuit 11 and an anode of the diode 13 is connected to an output terminal of the DC/DC converter 12. A cathode of the diode 13 is connected to a power supply terminal of the control IC 21. The DC/DC converter 12 outputs a prescribed voltage Vs (for example, 15 V).

One end of the second resistor 40 is connected to the output terminal of the booster circuit 11 (the input side of the voltage conversion unit 30, that is, the drain of the FET 31) and the other end of the resistor 40 is connected to the power supply terminal of the control IC 21. Further, the capacitor 15 is connected between the power supply terminal of the control IC 21 and a ground terminal (between operating voltage terminals). A serial circuit of the resistor 60 and the transistor 14 is connected across the capacitor 15, that is, between the operating voltage terminals of the control IC 21. That is, the serial circuit of the resistor 60 and the transistor 14 is connected between the resistor 40 and the inductor 32. Further, the resistor 60 may also be omitted. In this case, the transistor 14 of which the collector is connected to the resistor 40 and the emitter is connected to the inductor 32, is provided. A first output terminal of the microcomputer 22 is connected to the base of the transistor 14. Further, a second output terminal of the microcomputer 22 is connected to an input terminal of the control IC 21. The source of the FET 31, an input terminal of the inductor 32, and the like are connected to the ground terminal of the control IC 21. Further, the transistor 14 may be a photo transistor of an output of a photo-coupler.

The microcomputer 22 outputs a FET off signal for stopping the on/off operation of the FET 31 to the control IC 21.

Further, the microcomputer 22 outputs a Vc short signal to the base of the transistor 14 to turn on the transistor 14 so that the voltage Vc (that is, the operating voltage Vc of the control IC 21) across the capacitor 15 becomes zero.

Figure 2:
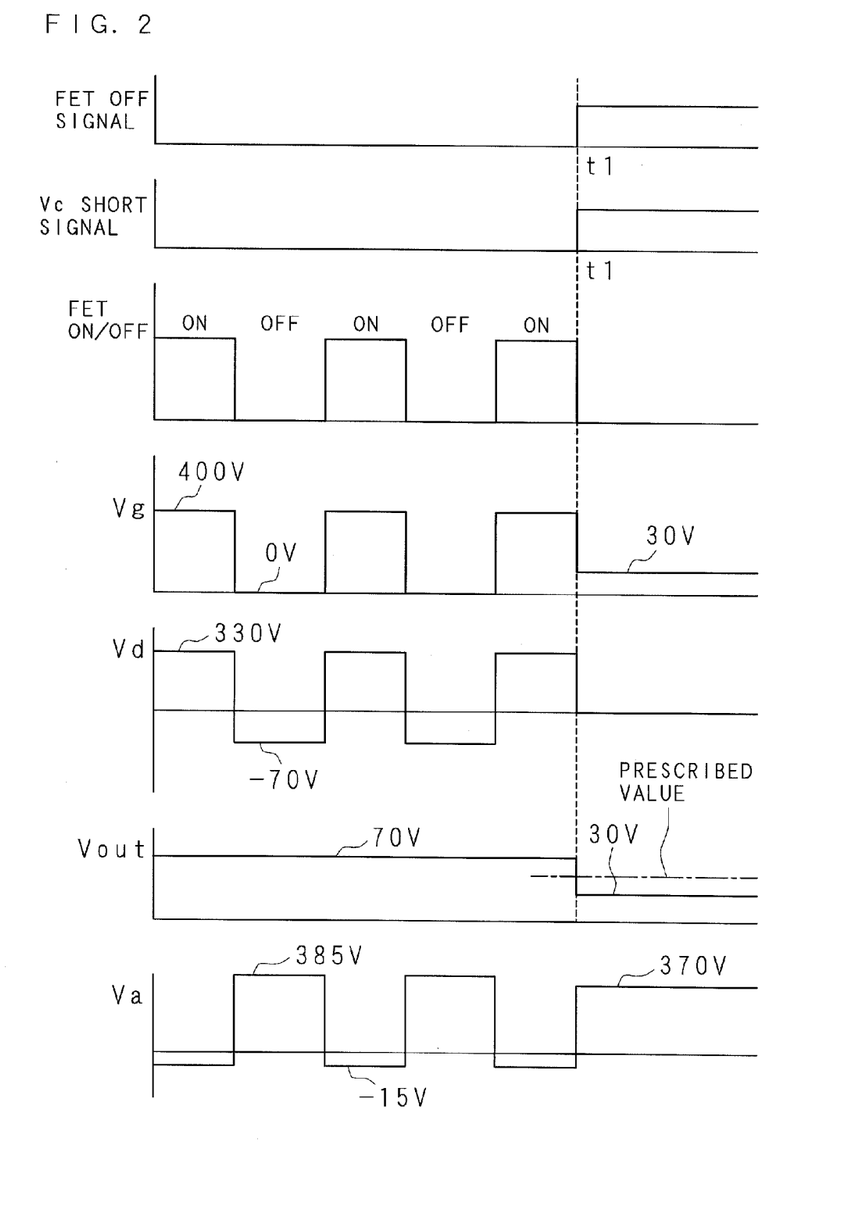
FIG. 2 is a time chart illustrating an example of an operation of a power supply device according to embodiment 1 when a light source is removed from the power supply device.

Next, an operation of the power supply device 100 according to the present embodiment will be described. FIG. 2 is a time chart illustrating an example of an operation of the power supply device 100 according to embodiment 1 when the light source 2 is removed from the power supply device. The time chart of FIG. 2 illustrates a case in which a state that the light source 2 is connected to the power supply device to be lit is shifted to a state that the light source 2 is removed from the power supply device 100 at time t1. Further, the time chart of FIG. 2 does not fully illustrate an actual voltage waveform, but provides a schematic illustration by simplifying the actual voltage waveform.

First, when the light source 2 is in a lighting state, the microcomputer 22 does not output the FET off signal and the Vc short signal. Therefore, the transistor 14 is turned off and the control IC 21 is applied with the operating voltage Vc, such that the control IC 21 may turn on/off the FET 31.

As illustrated in FIG. 2, when the voltage between the source and the drain of the FET 31 is considered to be zero in a period in which the FET 31 is turned on, a voltage Vg of the source of the FET 31 and the input terminal of the inductor 32 is equal to the input side voltage Vin and thus becomes 400 V.

In this case, the voltage Vout across the light source 2 becomes 70 V which is a total value VF of the forward voltage of each LED and the voltage conversion unit 30 reduces the input side voltage Vin (400 V) to the output voltage Vout (70 V) of the light source 2. A voltage difference (voltage drop) between the input side voltage Vin (400 V) and the output voltage Vout (70 V) becomes a voltage across the inductor 32. That is, the voltage Vd across the inductor 32 becomes 330 V (400 V−70 V).

The voltage Vg of the ground terminal of the control IC 21 becomes 400 V and the operating voltage Vc becomes 15, such that a voltage Va across the second resistor 40 becomes −15 V (400 V-415 V).

Since a counter electromotive force is generated in the inductor 32 to hold a current and a current flows through the diode 34 in a period in which the FET 31 is turned off, when the voltage between the anode and the cathode of the diode 34 is considered to be zero, the voltage Vg of the source of the FET 31 and the input terminal of the inductor 32 becomes a reference level and thus becomes 0 V.

In this case, the voltage Vout across the light source 2 is 70 V which is the total value VF of the forward voltage of each LED, such that the voltage Vd across the inductor 32 becomes −70 V.

The voltage Vg of the ground terminal of the control IC 21 becomes 0 V and the operating voltage Vc becomes 15 V, such that the voltage Va across the second resistor 40 becomes 385 V (400 V-415 V).

As described above, at the time of the general use of the light source 2 connected to the power supply device, the voltage conversion unit 30 reduces the input side voltage Vin to the output voltage Vout (=VF) of the light source 2 and generates the voltage difference between the input side voltage Vin and the output voltage Vout as the required voltage drop in the inductor 32. That is, the average of the voltage Vd across the inductor 32 becomes the required voltage drop.

When the light source 2 is removed at time t1, the microcomputer 22 outputs the FET off signal to the control IC 21 and outputs the Vc short signal to the transistor 14, based on the determination signal (determination result that the light source 2 is not connected) from the voltage current detection unit 17. By this, the operating voltage Vc of the control IC 21 becomes zero and the on/off operation of the FET 31 stops.

In the case in which the resistor 60 is not provided, when the on/off operation of the FET 31 stops, only steady-state current flows in the inductor 32 (stopping the driving of the voltage conversion unit 30) and the voltage Vd across the inductor 32 becomes approximately zero since a direct current resistance of the inductor 32 is very small. Further, both terminals of the capacitor 15 are short-circuited by the transistor 14, and therefore the operating voltage Vc becomes zero. Therefore, the serial circuit of the second resistor 40 and the first resistor 50 is in the state that connected between the input side voltage Vin and the reference level and the voltage dividing the input side voltage Vin by the resistor 40 and the resistor 50 is generated across the resistor 50.

Meanwhile, in the case in which the resistor 60 is provided, when the on/off operation of the FET 31 stops, only steady-state current flows in the inductor 32 (stopping the driving of the voltage conversion unit 30) and the voltage Vd across the inductor 32 becomes approximately zero since the direct current resistance of the inductor 32 is very small. Further, both terminals of the capacitor are short-circuited by the transistor 14 through the resistor 60, such that the operating voltage Vc may be lower than the voltage to operate the control IC 21. For example, when the resistor 40 is set to be 3.6 MΩ, the resistor 50 is set to be 0.3 MΩ, the resistor 60 is set to be 0.1 MΩ, a starting voltage of the control IC 21 is set to be 20 V, and the input side voltage Vin is set to be 400 V, such that the operating voltage becomes 10 V when the FET 31 is turned off.

The starting time may be shortened by connecting the transistor 14 to the resistor 60 in series when the light source 2 is reconnected. The operating voltage Vc does not become 0V due to the resistor 60 even in the state that the collector and the emitter of the transistor 14 are not short-circuited and the voltage divided by the resistor 40 and the resistor 50 is applied to the resistor 60. In this state, the operating voltage Vc (for example, 10 V) is set to be the starting voltage or less of the control IC 21, such that the operating voltage Vc may be enough to be charged up to the starting voltage from, for example, 10 V, not from 0 V at the time of the reconnection of the light source 2, thereby shortening the charging time and shortening the time required for driving the control IC 21. When the light source 2 is reconnected, the time when the operating voltage Vc of the control IC 21 is charged up to the starting voltage may be shortened to about half, comparing to the case that the resistor 60 is not provided.

When a resistance value of the resistor 40 is set to be 3.7 MΩ, a resistance value of the resistor 50 is set to be 0.3 MΩ, and the input side voltage Vin is set to be 400 V, the voltage Vout (=Vg) across the resistor 50 becomes 30 V and the voltage Va across the resistor 40 becomes 370 V, based on the Equation Vout=400 V×0.3 MΩ/(0.3 MΩ+3.7 MΩ). That is, the resistance values of the resistors 40 and 50 are appropriately set, such that the voltage Vout across the resistor 50 may be set to be a prescribed value (for example, 45 V) or less. Further, the resistance values of the resistors 40 and 50 may be set so that the voltage Vout becomes the forward voltage VF or less of the light source 2 which is connected between the output terminals.

As described above, the voltage current detection unit 17 determines whether or not the light source 2 is connected (whether or not the light source 2 is removed) and the output voltage control unit 20 controls the voltage Vout of the first resistor 50 to be a prescribed value or less when it is determined that the light source 2 is not connected (the light source 2 is removed). The output voltage between the output terminals of the power supply device 100 from which the light source 2 is removed is set to be a prescribed value or less through the resistor 50, such that it is possible to prevent the output voltage from being an overvoltage even when the light source 2 is removed.

Further, the resistor 40 is connected to the resistor 50 in series through the capacitor 15 and the inductor 32 of the voltage conversion unit 30. In other words, the first resistor 50 is connected to the second resistor 40 in series through the voltage conversion unit 30. When the light source 2 is not connected, both terminals of the capacitor 15 are short-circuited by the transistor 14 and only small current flows in the inductor 32, and the voltage Vd across the inductor 32 becomes almost zero, thereby it becomes to a state equivalent to the state that the resistors 40 and 50 are connected in series. That is, when it is determined that the light source 2 is not connected, the output voltage control unit 20 stops the generation of the voltage drop by the voltage conversion unit 30 (the inductor 32) and divides the input side voltage Vin by the resistors 40 and 50 to control the voltage of the resistor 50 to be the prescribed value or less.

By this, the voltage applied to the capacitor 33 connected to the resistor 50 in parallel may be set to be a prescribed value or less, in detail, 45 V or less, and the occurrence of overcurrent flowing in the light source 2 may be prevented at the time of connection even when the light source 2 having the forward voltage VF of 70 V is connected in this state.

As a comparative example, for instance, in a configuration of dividing the input side voltage by a serial circuit of the two resistors and suppressing the overvoltage between the output terminals of the power supply device when the light source is not connected, at the time of normal use when a load is connected, the voltage difference between the input side voltage and the divided voltage is applied to one of the two resistors at all times, such that power consumption at the one resistor may be increased.

According to the present embodiment, since the resistor 40 for dividing the input side voltage Vin is connected to the resistor 50 through the voltage conversion unit 30 (the inductor 32) for generating the voltage drop, when the required voltage Vout (=VF) is output from the voltage conversion unit 30 to the light source 2 in the state that the light source 2 is connected, the voltage applied to the resistor 40 may be reduced by as much as an amount corresponding to the voltage drop and the power consumption may be suppressed during normal use when the light source 2 is connected. In detail, when the FET 31 is turned on, the input side voltage Vin (400 V) is divided by the inductor 32 and the resistor 50 which is connected to the light source 2 in parallel and, as illustrated in FIG. 2, in the period in which the FET 31 is on, the voltage Va across the resistor 40 becomes −15 V. That is, in the period in which the FET 31 is on, since the inductor 32 is connected between the resistor 40 and the resistor 50, the voltage of the resistor 40 may be reduced, such that the power consumption at the resistor 40 may be reduced. Therefore, as a duty ratio (a ratio of the on time) of the FET 31 is increased, the power consumption at the resistor 40 may be reduced.

Further, the output voltage control unit 20 stops the operation of the control IC 21 to stop the on/off operation of the FET 31 when the voltage current detection unit 17 determines that the light source 2 is not connected. The on/off operation of the FET 31 stops and thus the generation of the voltage drop in the inductor 32 (the drop of the input side voltage) stops. By this, the voltage between the output terminals of the power supply device 100 when the light source 2 is not connected may be set to be a voltage which is a prescribed value or less obtained by dividing the input side voltage Vin by the resistors 40 and 50.

Figure 3:
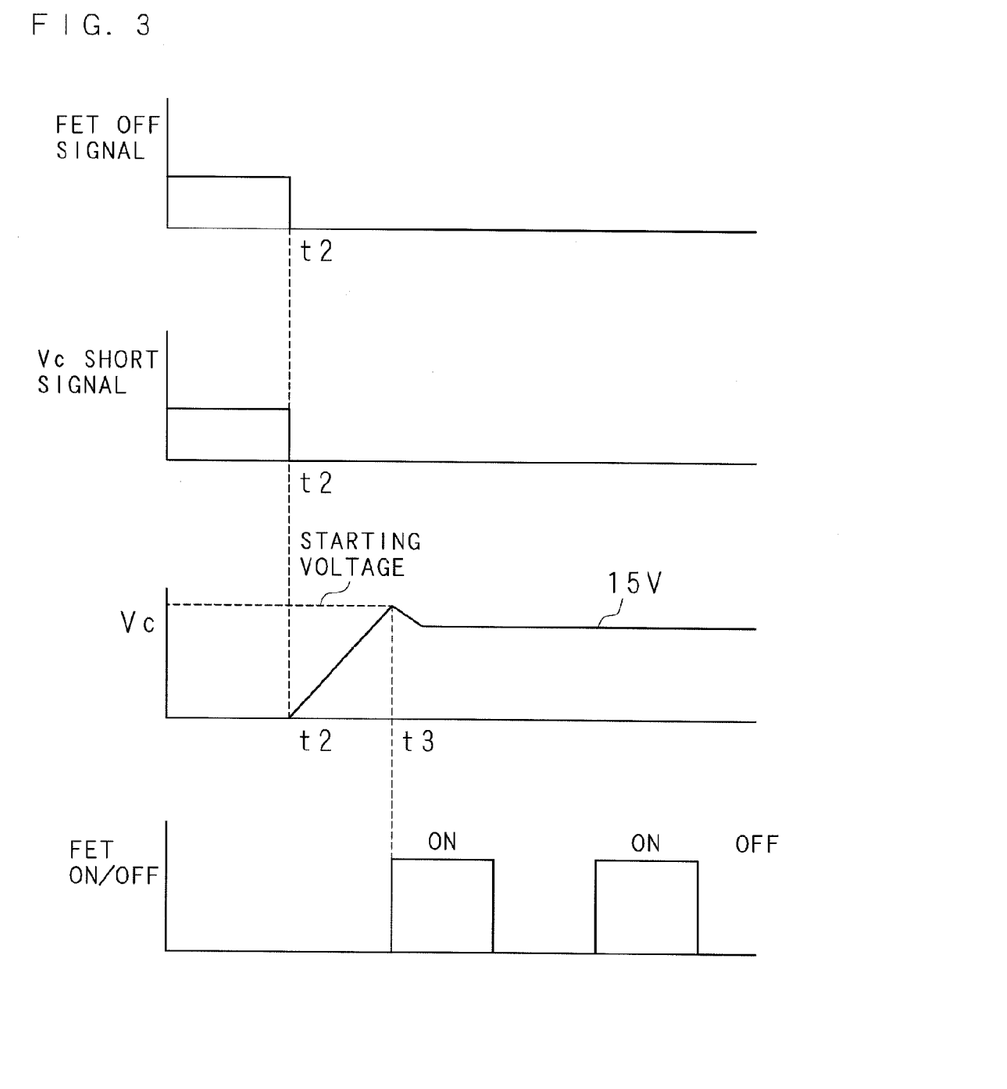
FIG. 3 is a time chart illustrating an example of the operation of the power supply device according to embodiment 1 when a light source is installed.

FIG. 3 is a time chart illustrating an example of the operation of the power supply device of embodiment 1 when a light source is installed. The time chart of FIG. 3 illustrates a case in which a state that the light source 2 is removed is shifted to a state that the light source 2 is installed in the power supply device 100 at time t2. Further, the time chart of FIG. 3 does not fully illustrate an actual voltage waveform, but provides a schematic illustration by simplifying the actual voltage waveform.

The microcomputer 22 outputs the FET off signal and the Vc short signal in the state that the light source 2 is removed. Therefore, the transistor 14 is turned on, and the operating voltage Vc for the control IC 21 becomes zero and the control IC 21 stops the on/off operation of the FET 31.

At time t2, when the light source 2 is installed in the power supply device 100, the voltage current detection unit 17 determines that the light source 2 is connected and outputs the determined result to the microcomputer 22.

For example, the determination whether the light source 2 is connected to the power supply device 100 may be made as follows. In the state that the light source 2 is removed, as described above, the voltage Vout across the resistor 50 (the resistance value is set to be, for example, 0.3 MΩ) becomes 30 V. In the light source 2, the resistor (the resistance value is set to be, for example, 0.3 MΩ) is connected across the serial circuit of the plurality of LEDs. When the light source 2 is connected, the resistor of the light source 2 side is connected with the resistor 50 in parallel and the resistance value becomes small (for example, 0.15 MΩ), such that the voltage Vout across the resistor 50 is reduced from 30 V to 15 V. Therefore, when the voltage Vout across the resistor 50 becomes a threshold value (for example, 20 V or the like) or less, it may be determined that the light source 2 is connected.

When the light source 2 is connected, the microcomputer 22 releases the output of the FET off signal and the Vc short signal. At time t2, since the voltage Vg of the ground voltage of the control IC 21 is 30 V, the anode of the diode 13 is applied with a voltage Vs (15 V), the cathode is applied with the voltage Vg (30 V), and the diode 13 is reversely biased. Thus, the diode 13 is not applied with a current. Therefore, at time t2, the input side voltage Vin is applied to the power supply terminal of the control IC through the resistor 40. That is, the operating voltage Vc of the control IC 21 is equal to the voltage charged in the capacitor 15 through the resistor 40 and is increased from the voltage of zero with a prescribed time constant.

As illustrated in FIG. 3, at time t3, when the operating voltage Vc becomes the starting voltage (the voltage capable of starting the operation of the control IC 21), the control IC 21 starts the on/off operation of the FET 31.

When the FET 31 starts the on/off operation, the reverse bias of the diode 13 is released, such that the voltage Vs is applied from the DC/DC converter 12 to the capacitor 15 through the diode 13 and the voltage (the operating voltage) Vc across the capacitor 15 becomes 15 V.

As described above, the output voltage control unit 20 has the control IC 21 as the driving unit that drives the FET 31. The voltage for operating the control IC 21 is supplied from the input side voltage Vin through the resistor 40. The resistor 40 is used as both of the starting resistor (a resistor for supplying the starting voltage to operate the control IC 21) for operating the control IC 21 and the resistor for limiting the output voltage of the power supply device 100, such that a resistor (a resistor connected with the resistor 50 in series to configure a voltage divider circuit) for limiting the output voltage of the voltage conversion unit 30 separately from the starting resistor is not required. The resistor for limiting the output voltage of the power supply device 100 in the state that the light source 2 is not connected requires characteristics to withstand high voltages, such that the size of the resistor is large and the cost thereof is relatively high. As the starting resistor supplying a voltage from the input side voltage Vin to the control IC 21, a resistor with characteristics to withstand high voltages is used, and by using the resistor 40 as the starting resistor, such that the number of resistors having the high voltage characteristics may be reduced, the size of the substrate on which each component of the power supply device 10 is mounted may be reduced, and a reduction in costs may be realized.

(Embodiment 2)

Figure 4:
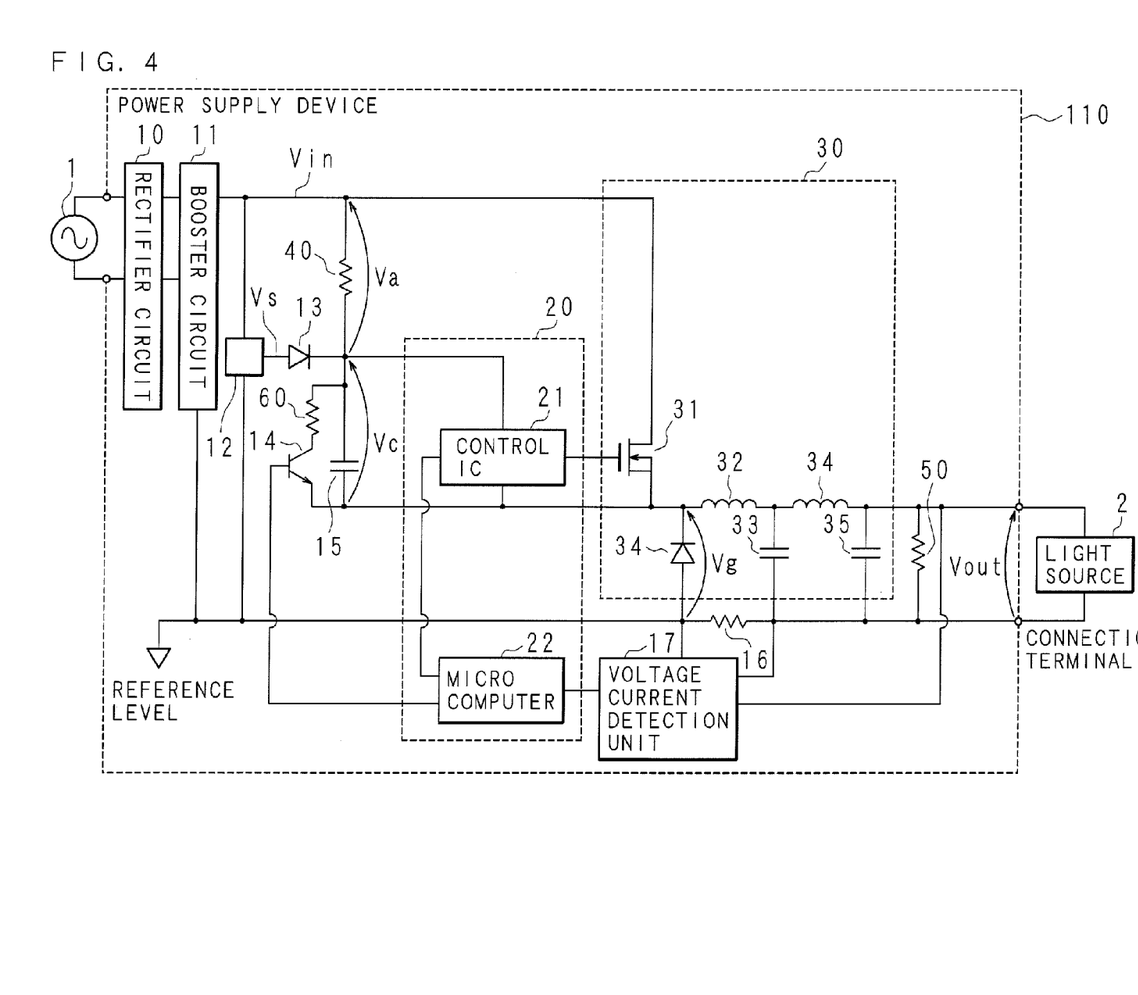
FIG. 4 is a block diagram illustrating an example of a configuration of a lighting device according to embodiment 2.

FIG. 4 is a block diagram illustrating an example of a configuration of a lighting device according to embodiment 2. According to embodiment 2, a power supply device 110 includes an inductor 34 and a capacitor 35, in addition to the component of the power supply device 100 according to embodiment 1. In addition, the corresponding parts with embodiment 1 have the same reference numbers, and a detailed description thereof will be omitted.

As illustrated in FIG. 4, a voltage conversion unit 30 includes a plurality of inductors 32 and 34 which are connected in series between the FET 31 and one end of the output terminals, a capacitor 35 which is connected in parallel between the output terminals, and a capacitor 33 which is connected between connection terminal of the inductors 32 and 34 and the other end of the output terminals in parallel.

That is, an input terminal of the inductor 32 is connected to the source of the FET 31, an input terminal of the inductor 34 is connected to an output terminal of the inductor 32, and the output terminal of the inductor 34 is connected to one end of the connection terminals of the light source 2. The capacitor 33 is connected between the output terminal of the inductor 32 and the reference level and the capacitor 35 is connected between the output terminal of the inductor 34 and the reference level. The capacitors 33 and 35 are connected to the light source 2 in parallel.

According to embodiment 1, an inductance of the inductor 32 is set to be, for example, 2 mH and a capacitance of the capacitor 33 is set to be 47 µF, such that a ripple (for example, a ratio of a peak-to-peak value of current to an average value of current) of an output current of the power supply device 100 may be set to be 1.3 or less.

According to the embodiment 2, the inductances of the inductors 32 and 34 are each set to be, for example, 2 mH and 220 µH, respectively and, the capacitances of the capacitors 33 and 35 are each set to be 1 µF and 1 µF, respectively, such that a discharging time of the capacitors 33 and 35 is shortened to about 10% in the case of embodiment 1, thereby further improving the ripple. As such, a plurality of stages of a combination of an inductor and an capacitor of the output side of the inductor are installed, to reduce the capacitance of the capacitors while holding the required voltage drop and the discharging time of the capacitor may be shortened to improve the ripple of the output current supplied to the light source.

(Embodiment 3)

Figure 5:
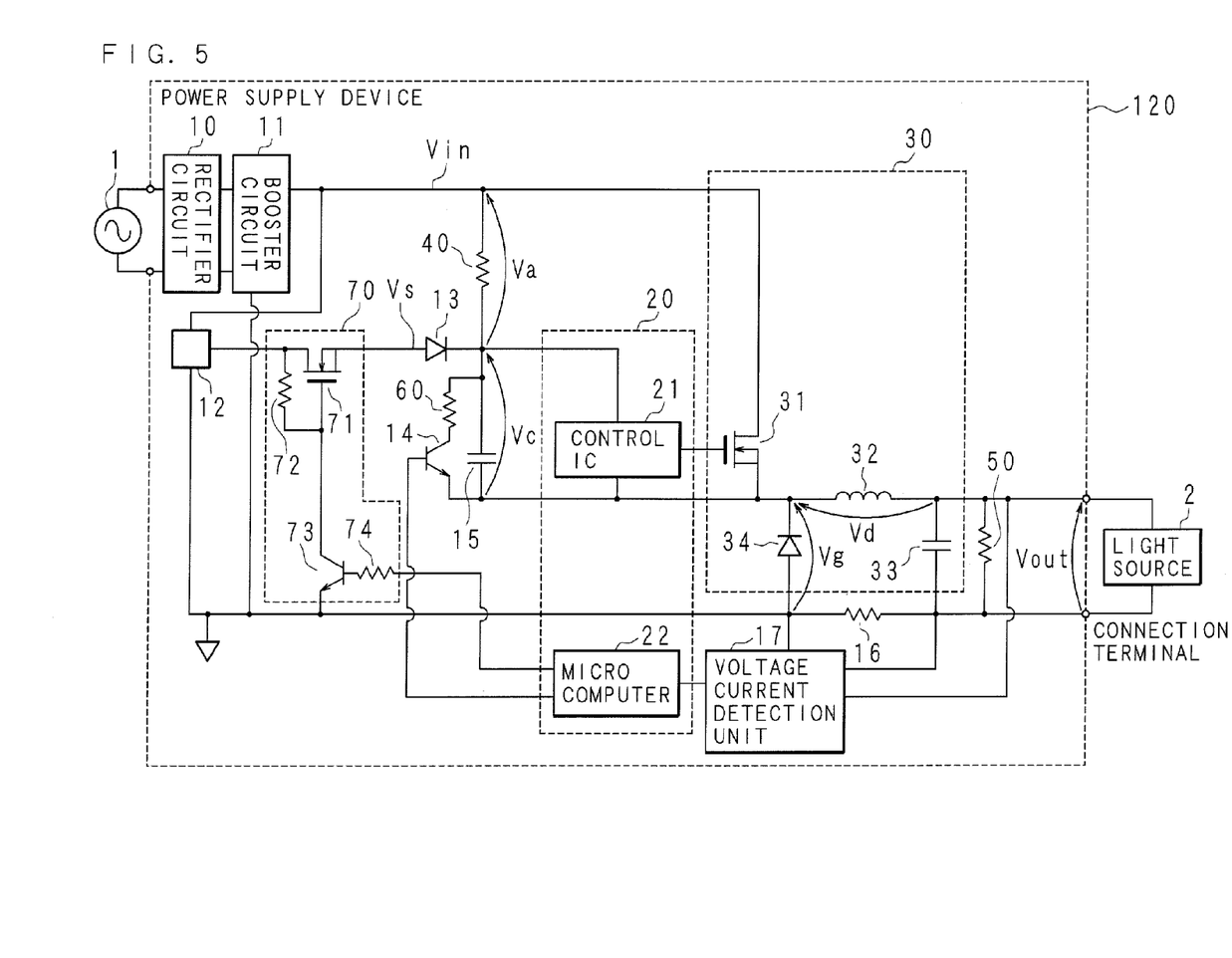
FIG. 5 is a block diagram illustrating an example of a configuration of a lighting device according to embodiment 3.

FIG. 5 is a block diagram illustrating an example of a configuration of a lighting device according to embodiment 3. According to the embodiment 3, a power supply device 120 includes a DC/DC converter 12 as a voltage generation unit that generates a voltage for operating the control IC 21 and a switch circuit 70 as a switch element which is installed in an electrical circuit between the DC/DC converter 12 and the control IC 21. Further, a microcomputer 22 outputs a voltage blocking signal to the switch circuit 70, instead of the FET off signal that is output to the driving IC 21.

As illustrated in FIG. 5, the switch circuit 70 includes: a FET 71 as the switch element of which the drain is connected to the output terminal of the DC/DC converter 12 and the source is connected to the anode of the diode 13, a resistor 72 which is connected between the drain and the gate of the FET 71, a transistor 73 which is connected between the gate of the FET 71 and the reference level, and a resistor 74 which is connected to the base of the transistor 73. The voltage blocking signal from the microcomputer 22 is output to the base of the transistor 73 through the resistor 74. Further, instead of the FET 71, another switch element such as a bipolar transistor, and the like may also be used.

The microcomputer 22 outputs the voltage blocking signal to the transistor 73 (the switch circuit 70) in the state that the light source 2 is removed, instead of the FET off signals of the embodiments 1 and 2. By this, the transistor 73 is turned on and the FET 71 is turned off, such that the voltage supplied from the DC/DC converter 12 to the control IC 21 may be blocked. When the operating voltage is reduced, the control IC 21 stably stops the driving of the FET 31 and stops the on/off operation of the FET 31. Further, the transistor 14 is on in the state that the light source 2 is removed.

Even when the control IC 21 does not include a control terminal that acquires a signal from the microcomputer, the operation of the control IC 21 may stop, without directly receiving the signal from the microcomputer 22. In addition, the corresponding parts with embodiment 1 have the same reference numbers, and a detailed description thereof will be omitted.

As described above, according to the embodiments 1 to 3, the starting resistor of the control IC 21 and the resistor for limiting the output voltage when the light source 2 of the power supply device 100 is not mounted are in combined use, such that an area of the substrate on which components within the power supply device 100 are mounted may be reduced and the cost of the components may be reduced. Further, one of the two resistors for limiting the output voltage is installed at a front end (an input side) of the voltage conversion unit 30 and is connected to the other resistor through the inductor included in the voltage step-down circuit, such that the power consumption in the resistor may be suppressed.

Further, according to the embodiments 1 to 3, a transformer for driving the FET 31 is not used, such that the power supply device may be configured at a low cost and miniaturized.

The embodiments 1 to 3 employ the configuration of a so-called high-side drive type in which the FET 31 is installed between the electrical circuits of a positive side of the light source 2, but the drive type is not limited to the high-side drive, and therefore the drive type may be a low-side drive type in which the FET is installed between the electrical circuits of a negative side of the light source 2.

According to the embodiments 1 to 3, the light source 2 may be allowed to be dimmed. When the light source 2 is dimmed, it is preferable to control the current flowing in the light source 2 by controlling a driving signal output to the gate of the FET 31 from the control IC 21, for example, changing the duty ratio of the on time of the FET 31. In the operation state of the inductor 32, there are three modes, that is, a continuous mode in which the current flowing in the inductor 32 includes a DC component at all times, a discontinuous mode in which the current flowing in the inductor 32 has a pause period, and a critical mode that exists at a boundary between the continuous mode and the discontinuous mode. In order to reduce the entire loss of the power supply device in the diode including the inductor 32, the FET, or the like, it is preferable to operate the inductor 32 in the critical mode. However, when the frequency of the on/off operation of the FET 31 is a variable type, the frequency of the on/off operation of the FET 31 is increased when the light source is dimmed in the critical mode (for example, when the current flowing in the light source 2 is reduced), such that the switching loss of the FET 31, the diode, the FET or the like is increased. Therefore, the frequency of the on/off operation of the FET 31 is preferably the fixed type.

The above embodiments describe examples in which the LED is used as the light source, but they are not limited thereto, and therefore any light source of the current driving type in which the luminosity is determined by the current value may be applied to other light sources, such as electroluminescence (EL). Technical features described in the above embodiments of the present invention can form a new technical solution in combination with each other.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power supply device, comprising:
a first resistor which is connected in parallel between output terminals;
a determination unit configured to determine whether or not a load is connected between the output terminals;
a second resistor which is connected to the first resistor in series;
a voltage conversion unit configured to convert an input side voltage into a required voltage and output the voltage to the output terminals;
a driving unit configured to drive the voltage conversion unit,
wherein the driving unit stops the driving of the voltage conversion unit when the determination unit determines that the load is not connected;
an output voltage control unit which divides the input side voltage by the first resistor and the second resistor that powers the driving unit such that a voltage between the output terminals, when the load is not connected, is controlled to be lower than, a voltage between the output terminals in the case that the load is connected between the output terminals, when the driving unit stops the driving of the voltage conversion unit.

2. The power supply device according to claim 1, wherein a voltage for operating the driving unit is supplied from the input side voltage through the second resistor.

3. The power supply device according to claim 2, wherein the second resistor is connected with the first resistor in series through the voltage conversion unit.

4. The power supply device according to claim 2, wherein the voltage conversion unit includes:
a FET;
an inductor having one side connected to the FET and the other side connected to the output terminal; and
a capacitor connected in parallel between the output terminals,
wherein the input side voltage is reduced by the inductor by the on/off operation of the FET to output the required voltage,
the second resistor is connected with the first resistor in series through the inductor, and
the output voltage control unit stops the on/off operation of the FET and stops the reduction in the input side voltage by the inductor to control the voltage between the output terminals so that the voltage is a prescribed value or less.

5. The power supply device according to claim 3, wherein the voltage conversion unit includes:
a FET;
an inductor having one side connected to the FET and the other side connected to the output terminal; and
a capacitor connected in parallel between the output terminals, wherein the input side voltage is reduced by the inductor by the on/off operation of the FET to output the required voltage, the second resistor is connected with the first resistor in series through the inductor, and the output voltage control unit stops the on/off operation of the FET and stops the reduction in the input side voltage by the inductor to control the voltage between the output terminals so that the voltage is a prescribed value or less.

6. The power supply device according to claim 4, further comprising:

a transistor of which a collector and an emitter are connected between the second resistor and the inductor, wherein the voltage for operating the driving unit is set to become a threshold value or less by turning on the transistor, when the determination unit determines that the load is not connected.

7. The power supply device according to claim 5, further comprising:

a transistor of which a collector and an emitter are connected between the second resistor and the inductor, wherein the voltage for operating the driving unit is set to become a threshold value or less by turning on the transistor, when the determination unit determines that the load is not connected.

8. The power supply device according to claim 6, further comprising: a resistor which is connected to the transistor in series.

9. The power supply device according to claim 7, further comprising: a resistor which is connected to the transistor in series.

10. The power supply device according to claim 4, wherein the voltage conversion unit includes:

a plurality of inductors which are connected in series between the FET and one end of the output terminals; and a plurality of capacitors which are connected in parallel between the output terminals and between connection terminal of the inductors and the other end of the output terminals.

11. The power supply device according to claim 5, wherein the voltage conversion unit includes:

a plurality of inductors which are connected in series between the FET and one end of the output terminals; and a plurality of capacitors which are connected in parallel between the output terminals and between connection terminal of the inductors and the other end of the output terminals.

12. The power supply device according to claim 2, further comprising:

a voltage generation unit configured to generate the voltage for operating the driving unit; and a switch element which is installed in an electrical circuit between the voltage generation unit and the driving unit, wherein the output voltage control unit stops the operation of the driving unit by turning off the switch element to control the voltage between the output terminals so that the voltage is a prescribed value or less, when the determination unit determines that the load is not connected.

13. The power supply device according to claim 3, further comprising:

a voltage generation unit configured to generate the voltage for operating the driving unit; and a switch element which is installed in an electrical circuit between the voltage generation unit and the driving unit, wherein the output voltage control unit stops the operation of the driving unit by turning off the switch element to control the voltage between the output terminals so that the voltage is a prescribed value or less, when the determination unit determines that the load is not connected.

14. A lighting device, comprising:

the power supply device according to claim 1; and a detachable light source, wherein a required voltage is output from the power supply device to the light source.

\* \* \* \* \*